United States Patent [19]

Wallace et al.

[11] 4,412,982

[45] Nov. 1, 1983

[54] ZIRCONIUM-TITANIUM-MANGANESE-IRON ALLOY CHARACTERIZED BY ZRMN$_2$ STOICHIOMETRY

[75] Inventors: William E. Wallace, Pittsburgh, Pa.; Vijay K. Sinha, Bihar, India; Faiz Purarian, Qazvin, Iran

[73] Assignee: Koppers Company, Inc., Pittsburgh, Pa.

[21] Appl. No.: 373,672

[22] Filed: Apr. 30, 1982

[51] Int. Cl.$^3$ .................. C22C 30/00; C01B 6/00
[52] U.S. Cl. .................. 423/644; 420/581; 420/900; 420/422; 420/434
[58] Field of Search .............. 420/417, 580, 581, 434, 420/422, 900; 423/644, 648

[56] References Cited

U.S. PATENT DOCUMENTS

4,228,145 10/1980 Gamo et al. .................. 423/644

Primary Examiner—L. Dewayne Rutledge
Assistant Examiner—Christopher W. Brody
Attorney, Agent, or Firm—Donald M. MacKay; J. Timothy Keane; Herbert J. Zeh, Jr.

[57] ABSTRACT

A quaternary alloy consisting of zirconium, titanium, manganese and iron is characterized in having C14 hexagonal crystal structure and ZrMn$_2$ stoichiometry. Members of a preferred class of compounds, represented by the empirical formula $Zr_{1-x}Ti_xMn_{2-y}Fe_y$ wherein "x" has a value between 0.05 and 0.3 and "y" has a value between 0.1 and 1, are particularly suitable for use as hydrogen storage materials.

19 Claims, 8 Drawing Figures

PRESSURE-COMPOSITION ISOTHERMS FOR
$Zr_{0.8}Ti_{0.2}MnFe-H_2$ SYSTEM

ZIRCONIUM-TITANIUM-MANGANESE-IRON ALLOY CHARACTERIZED BY ZRMN₂ STOICHIOMETRY

BACKGROUND OF THE INVENTION

1. Field of the Invention

Many types of intermetallic compounds are known for use as hydrogen storage materials. Of particular interest herein are hydrogen storage materials provided by four-component alloys of zirconium, titanium, manganese and iron, which alloys are characterized by C14 hexagonal crystal structure and $ZrMn_2$ stoichiometry.

2. State of the Art

A material suitable for storage of hydrogen must satisfy many demanding criteria. In addition to large storage capacity for hydrogen, a hydride formed during hydrogen absorption by a material should have low enthalpy characteristics; that is, the quantity of heat per mole of alloy required for formation of the hydride is preferably relatively low. Also, the hydrogen storage material should absorb and desorb hydrogen quickly, preferably at a pressure near one atmosphere and near room temperature, and the material should show a minimum of hysteresis effects during a hydrogen absorption/desorption cycle.

Intermetallic compounds which have received much attention for use as hydrogen storage materials are provided by derivatives of $ZrMn_2$ compounds, characterized by hexagonal C14 crystal structure and $AB_2$ stoichiometry. It is well known that the $ZrMn_2$ system is capable of absorbing copious quantities of hydrogen, but that hydrides formed from the $ZrMn_2$ system are too stable to be of practical significance. In search of improved $ZrMn_2$-based systems, alloys have been prepared which contain other elements substituted for all or a portion of the zirconium, but with the $AB_2$ stoichiometry maintained in the new alloy. For example, in Shaltiel et al., *J. Less. Comm. Metals*, 53, 117–131 (1977), there are described changes in the properties of $AB_2$ Laves-phase $ZrMn_2$-based compounds by substitution of manganese with a 3d transition metal in accordance with the empirical formula $Zr(Co_xM_{1-x})_2$ and $Zr(Fe_xM_{1-x})_2$ wherein M=V, Cr, Mn and x is between zero and one. Other studies of partial substitution of zirconium in $ZrMn_2$ alloys with titanium to form the hydrides of $Ti_{1-x}Zr_xMn_2$ pseudo-binaries are described in Oesterreicher et al., *Mat. Res. Bull.*, 13, 83–88 (1978). In Fujii et al., *J. Phys. Chem.*, 85, 3112–16 (1981), ternary alloys are described of the type $Zr_{1-x}Ti_xMn_2$ wherein x=0 to 0.5.

In U.S. Pat. No. 4,160,014 to Gamo et al., there are described hydrogen storage materials provided by quaternary alloys, only one of which contains zirconium, titanium, manganese and iron. This particular alloy has the empirical formula $Ti_{0.6}Zr_{0.4}Mn_{1.9}Fe_{0.1}$ and is characterized by crystal lattice parameters of a=4.907 and b=8.084.

SUMMARY OF THE INVENTION

Improved hydrogen storage materials are provided by a quaternary alloy consisting of zirconium, titanium, manganese and iron, which alloy is characterized in having the C14 hexagonal crystal structure and $ZrMn_2$ stoichiometry. A representative family of such alloys may be expressed by the empirical formula $$Zr_{1-x}Ti_xMn_{2-y}Fe_y \qquad (I)$$

wherein "x" has a value in a range from about 0.05 to about 0.3 and "y" has a value in a range from about 0.1 to about 1. Alloys of particular interest within the scope of the formula I family of compounds are as follow:

$Zr_{0.8}Ti_{0.2}MnFe$ $Zr_{0.7}Ti_{0.3}MnFe$ $$Zr_{0.75}Ti_{0.25}Mn_{1.1}Fe_{0.9} \qquad (II)$$

Each of these specific alloys is characterized in having a desirable combination of properties. For example, the alloys have relatively low enthalpy as compared to many $ZrMn_2$-based systems. More significantly, it has been found that by partial replacement of zirconium with titanium and by partial replacement of manganese with iron in the $ZrMn_2$-based system, there is obtained a 400-fold increase in the hydrogen vapor pressure as compared to $ZrMn_2$, without a significant decrease in hydrogen capacity. Alloys of the invention are thus very useful in that the alloys have fairly constant absorption/desorption characteristics in a pressure range of about one to three atmospheres at about room temperature.

DESCRIPTION OF PREFERRED EMBODIMENTS

A quaternary alloy of the invention is characterized generally as a Laves-type intermetallic compound composed of zirconium, titanium, manganese and iron in a C14 hexagonal crystal structure. The compound is further characterized in being a $ZrMn_2$-based alloy in which a portion of the zirconium is replaced by titanium, and a portion of the manganese is replaced by iron, in a manner to maintain, substantially, the $ZrMn_2$ stoichiometry. The crystal structure is characterized by lattice parameters having approximate values in the following ranges:

a=4.96 Å to 5.03 Å c=8.10 Å to 8.26 Å

A general procedure for preparation of these quaternary alloys follows. Weighed amounts of the zirconium, titanium and iron constituents are placed in a copper boat for heating to a fusing temperature. Heating is accomplished typically by means of an r.f. 450 KHz induction heater. The copper boat is mounted inside a vacuum-tight quartz tube through which a stream of Ti-gettered argon passes during the heating period. Fusing of the first three constituents takes place by heating a mixture of these constituents to about 1600° C. in about two minutes, and holding at that temperature for about two minutes. Then the sample is cooled to room temperature in a period of about one minute and the hardened sample is turned over in the boat. Melting and cooling are repeated through four cycles, typically. After two melting/cooling cycles, the sample is weighed for determination of weight loss, which loss typically is negligible. Then a weighed amount of manganese, which includes a ten percent stoichiometric excess of manganese over the amount of manganese desired in the final sample, is added to the fused zirconium-titanium-iron sample. Excess manganese is required to compensate for loss of manganese by evaporation. Usually, the actual manganese content of a sample can be controlled to within ± one percent of the theoretical amount. Then the sample is annealed for a period of about two hours at about 1000° C. X-ray diffraction analysis of the annealed sample typically shows a material consisting of a single phase.

In order to activate the sample to make it suitable as a hydrogen storage material, about two grams of the annealed sample is placed in a stainless-steel pressure reactor vessel suitable for use in forming a hydride of the sample. The reactor is evacuated to a pressure of about $10^{-3}$ Torr. Then pure hydrogen is pumped into the reactor to a pressure of about 40 to 50 atm., with the reactor vessel temperature initially at about 25° C., until hydrogen is no longer absorbed by the sample. Usually, within two minutes of the time hydrogen is initially introduced into the reactor, the reaction vessel temperature increases to about 50° C. Then the reactor is allowed to cool to room temperature over a period of about 30 minutes, after which time the pressure within the reactor is usually about 45 atm. The pressure in the reactor is reduced to ambient, and then the sample is subjected to a pressure of about $10^{-3}$ Torr for about 20 minutes in order for the sample to desorb substantially all of the previously-absorbed hydrogen.

In order to obtain a fully-activated hydrogen storage material, the sample is subjected to about 25 sorption-desorption cycles, under conditions as described for the activation procedure above. At the end of this activating period, there is obtained a repeatable pressure-composition profile. To obtain crystal structure data on the hydrides, a portion of the activated sample is hydrogenated to a known composition in accordance with the previously-established pressure-composition isotherm. Then the hydrogenated sample is cooled quickly by quenching the sample boat (reactor) in liquid nitrogen, and rapidly pumping away remaining gaseous hydrogen. In accordance with the technique of Gualtieri et al., [*J. Appl. Phys.*, 47, 3432 (1976)], a few Torr of $SO_2$ is admitted to the reaction vessel to poison the surface of the sample and thereby seal in the hydrogen. After the sample warms to room temperature, X-ray diffraction data is obtained for the sample.

In order to demonstrate the preparation of the zirconium-titanium-manganese-iron quaternary alloys and their hydrides, and to obtain data as to characteristics and properties of the alloys, three ternary alloys containing varying amounts of the four constituent elements were actually prepared in accordance with the aforementioned, generally-described procedures. Essential parameters such as constituent weights, melting and annealing temperatures, lattice parameters and hydriding characteristics are summarized in Tables I–II. Each of the constituents was 99.9 percent pure and was used as obtained from Alfa Products, Ventron Div., Danvers, MA.

TABLE I

Preparation of $Zr_{1-x}Ti_xMn_{2-y}Fe_y$ Quaternary Alloys

| Sample No. | Alloy | Amount of Each Constituent (gm) | | | | Heat Treatment | | | | Sample Wt. Loss During Preparation (gm) |
| | | | | | | Melting Temp (°C.) | Melting Cycles | | Annealing | |
| | | Zr | Ti | Mn | Fe | | No. | Melt Period (Min) | Temp (°C.) | Period (Hrs) | |
| I | $Zr_{0.8}Ti_{0.2}MnFe$ | 1.702 | 0.223 | 1.409 | 1.302 | ~1500 | 5 | 3 | ~1000 | 2 | .015 |
| II | $Zr_{0.8}Ti_{0.3}MnFe$ | 1.534 | 0.345 | 1.591 | 1.342 | ~1500 | 5 | 3 | ~1000 | 2 | .016 |
| III | $Zr_{0.75}Ti_{0.25}Mn_{1.1}Fe_{0.9}$ | 1.500 | 0.263 | 1.325 | 1.102 | ~1500 | 5 | 3 | ~1000 | 2 | .015 |

TABLE II

Lattice Parameters and Hydrogen Absorption for $Zr_{1-x}Ti_xMn_{2-y}Fe_y$ Quaternary Alloys

| Sample No. | Alloy Alloy Hydride | Lattice Parameters a(Å) c(Å) | | Unit Cell Volume V(Å)³ | Change In Alloy Volume in Forming Hydride ΔV/V % | Hydrogen Storage Capacity ml $H_2$ per gm alloy | | |
| | | | | | | @ 7 atm | @ 15 atm | @ 40 atm |
| I | $Zr_{0.8}Ti_{0.2}MnFe$ | 4.980 | 8.163 | 175.3 | 19.0 | 190 | 203 | 209 |
| | $Zr_{0.8}Ti_{0.2}MnFeH_{3.0}$ | 5.284 | 8.628 | 208.6 | | | | |
| II | $Zr_{0.7}Ti_{0.3}MnFe$ | 4.958 | 8.111 | 172.7 | 20.2 | 144 | 149 | 149 |
| | $Zr_{0.7}Ti_{0.3}MnFeH_{2.0}$ | 5.271 | 8.623 | 207.5 | | | | |
| III | $Zr_{0.75}Ti_{0.25}Mn_{1.1}Fe_{0.9}$ | 4.991 | 8.174 | 176.4 | 19.0 | 177 | 183 | 193 |
| | $Zr_{0.75}Ti_{0.25}Mn_{1.1}Fe_{0.9}H_{3.1}$ | 5.290 | 8.659 | 210.0 | | | | |

Figure 1:
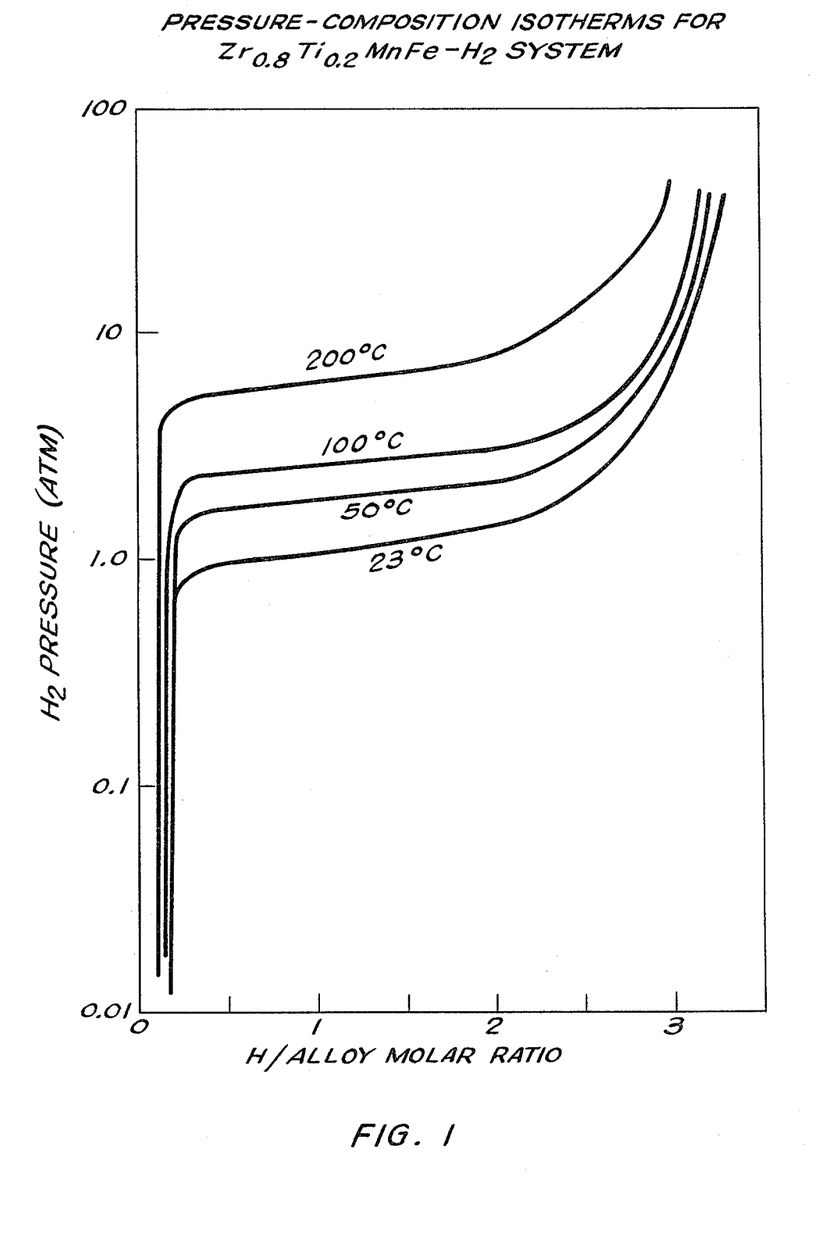
FIG. 1 is an equilibrium pressure-composition isotherm for the system $Zr_{0.8}Ti_{1.2}MnFe-H_2$, which is a representative quaternary alloy hydride of the invention.
Figure 2:
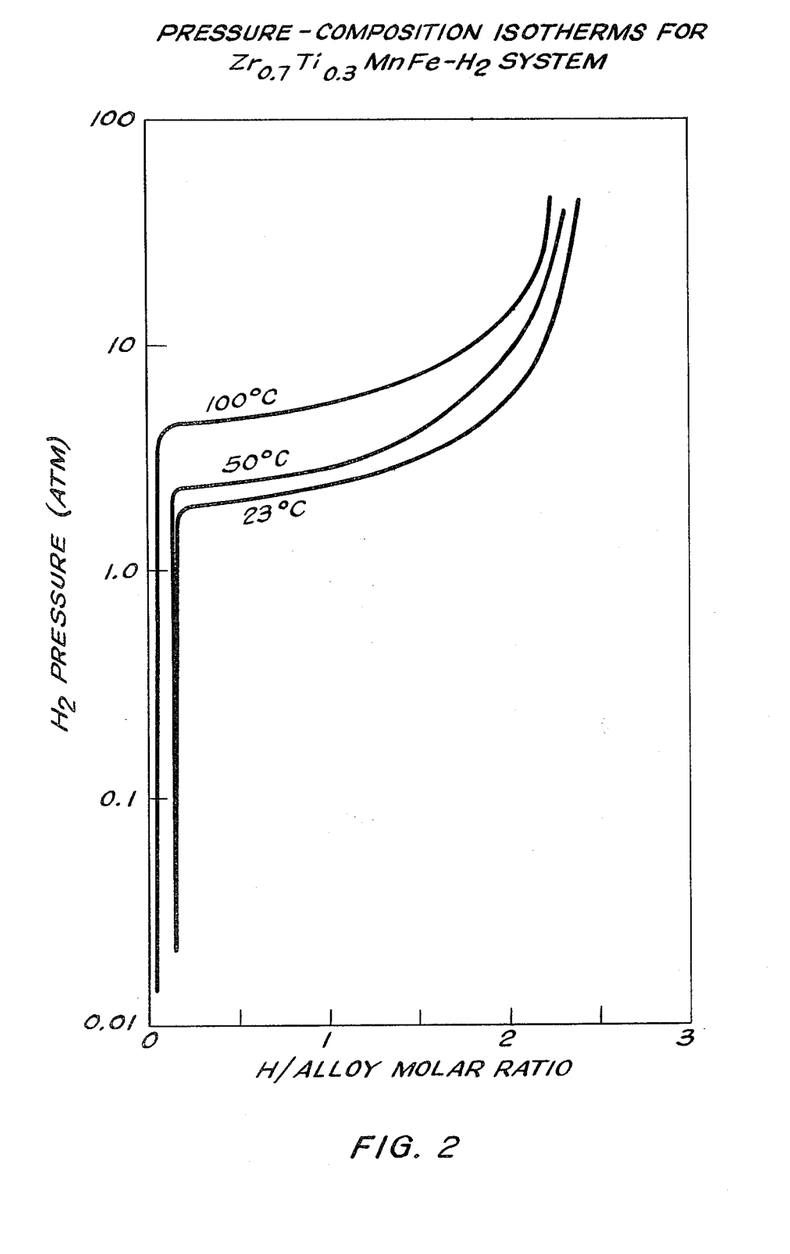
FIG. 2 is an equilibrium pressure-composition isotherm for the system $Zr_{0.7}Ti_{0.3}MnFe-H_2$, which is another representative quaternary alloy hydride of the invention.
Figure 3:
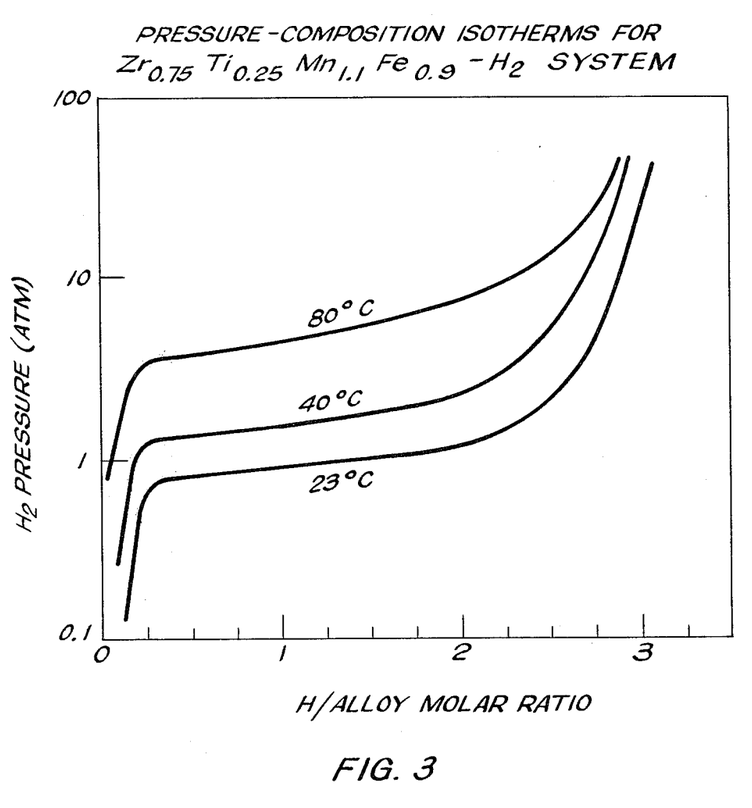
FIG. 3 is an equilibrium pressure-composition isotherm for the system $Zr_{0.75}Ti_{0.25}Mn_{1.1}Fe_{0.9}-H_2$, which is another representative quaternary alloy of the invention.
Figure 4:
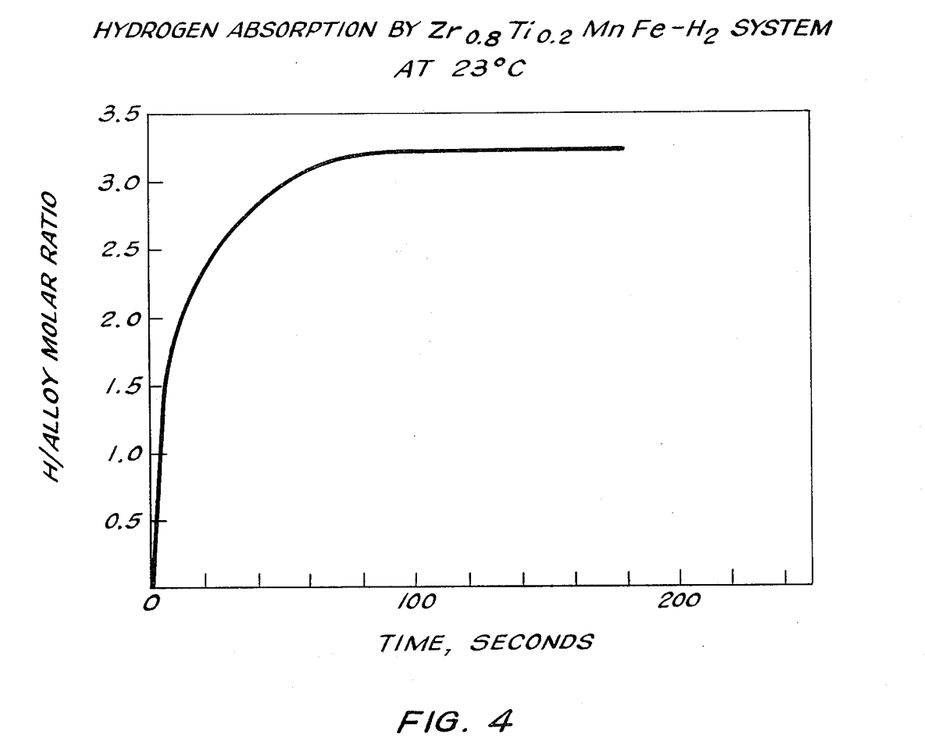
FIGS. 4 and 5 are plots of the rates of absorption and desorption, respectively, of hydrogen by the system $Zr_{0.8}Ti_{0.2}MnFe-H_2$ at various temperatures.
Figure 5:
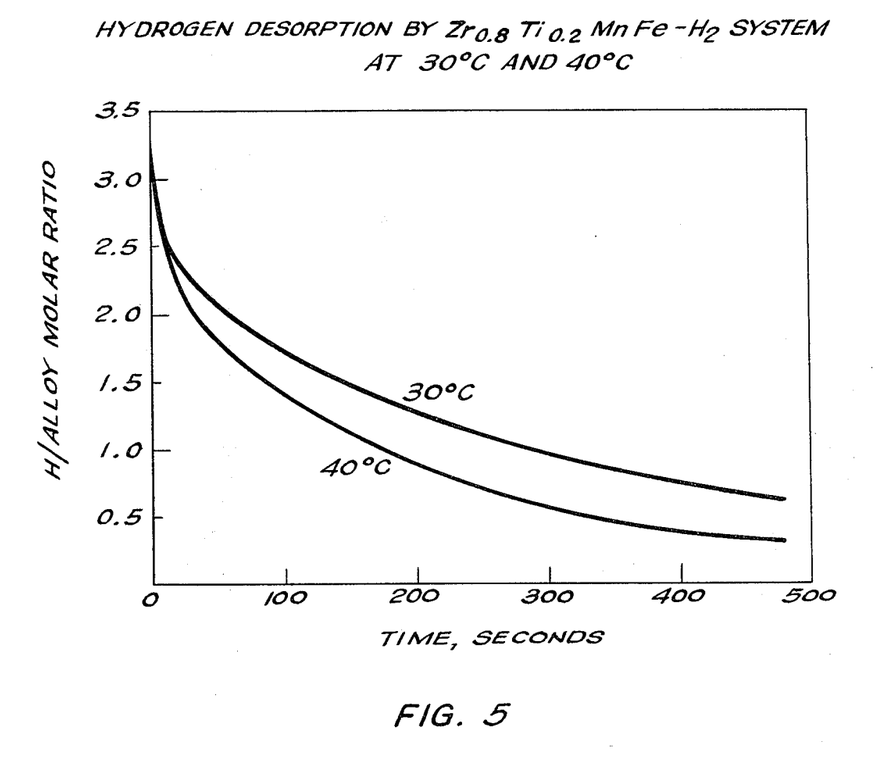
Figure 6:
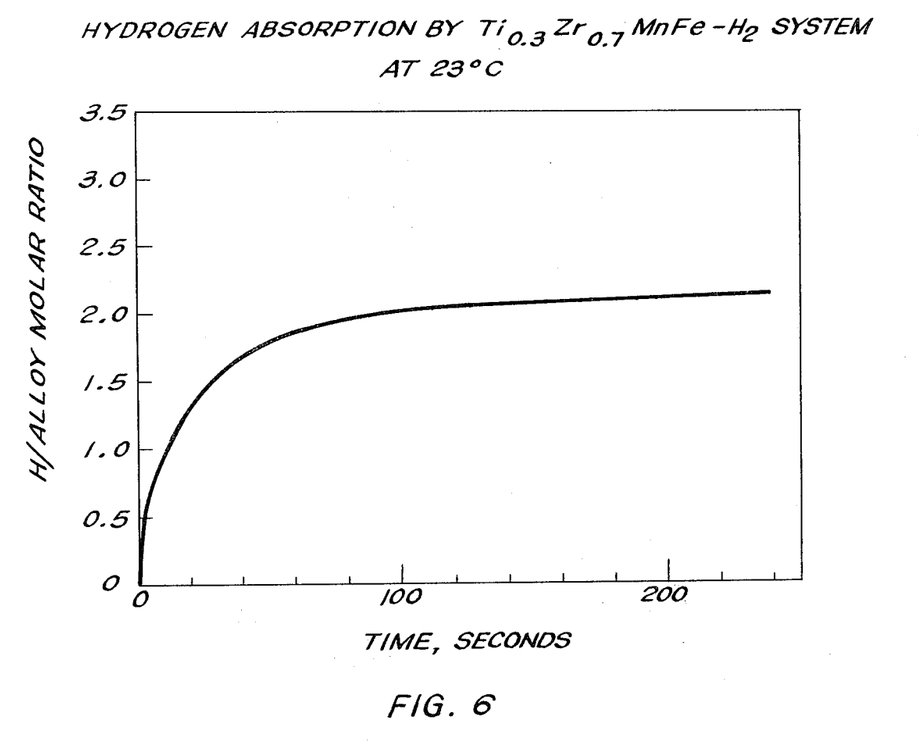
FIGS. 6 and 7 are plots of the rates of absorption and desorption, respectively, of hydrogen by the system $Zr_{0.7}Ti_{0.3}MnFe-H_2$ at various temperatures.
Figure 7:
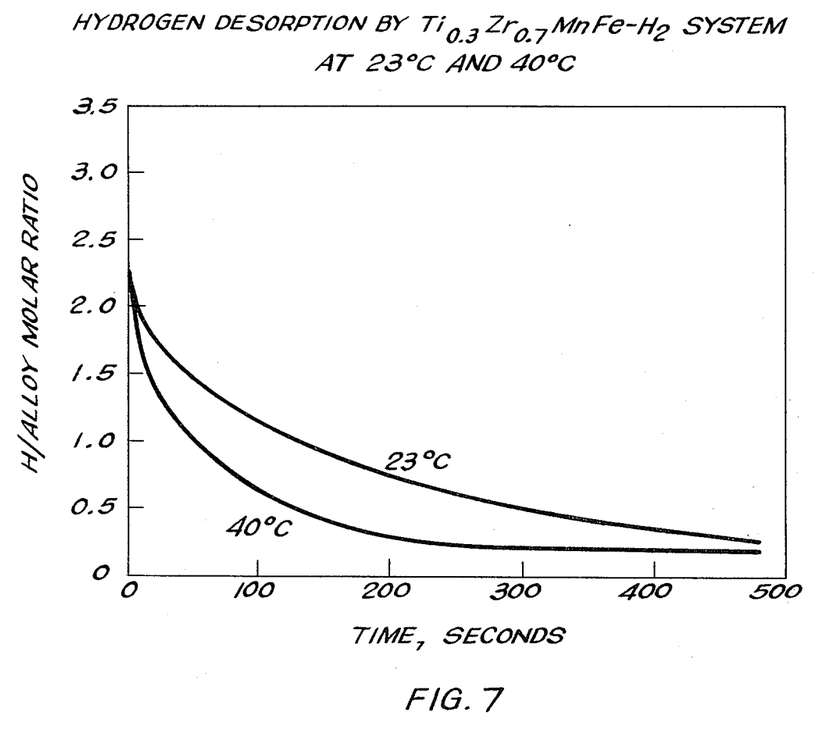

The pressure-composition isotherms of FIGS. 1–3 are associated with three representative embodiments of the zirconium-titanium-manganese-iron alloy system of the invention and demonstrate important advantages of this quaternary system. For example, at about room temperature these three alloy systems can be hydrogenated and dehydrogenated at hydrogen pressures of about one atm. Also, these alloy systems absorb and desorb hydrogen at a fairly constant pressure over a wide range of hydrogen concentration, namely, from about 0.5 to about 2.0 gram-atom of hydrogen per mole of alloy.

The quaternary alloys of the invention are also characterized by fairly rapid absorption/desorption of hydrogen. As shown in FIG. 3, a condition of 90 percent complete absorption of hydrogen can be obtained in less than about 80 seconds.

Figure 8:
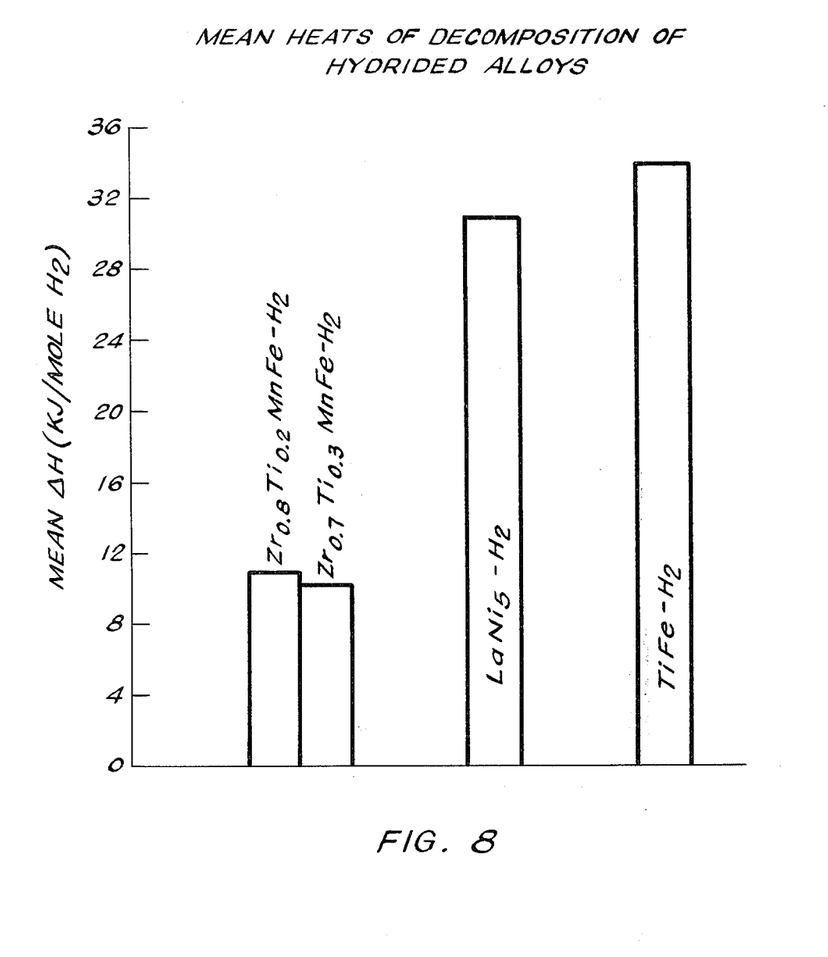
FIG. 8 is a comparison of mean enthalpies of the systems $Zr_{0.8}Ti_{0.2}MnFe-H_2$ and $Zr_{0.7}Ti_{0.3}MnFe-H_2$ with conventional hydride systems.

Two of the alloys of the invention have relatively low enthalpy ($\Delta H$) as compared to conventional LaNi$_5$ hydride and CaNi$_5$ hydride systems as shown in FIG. 8. The small value of $\Delta H$ is significant in regard to the exploitation of hydrogen as a fuel. As the heat absorbed in the release of hydrogen is smaller, the fuel value of the hydrogen stored in the hydride is correspondingly enhanced since less heat must be allocated to effect the endothermal release of hydrogen from the hydride. The small value of $\Delta H$ has the additional advantage in that heat flow demands are reduced. This could be a significant factor in large-scale applications involving massive hydride beds since such beds have poor thermal conductivity characteristics.

Although specific examples of the invention have been set forth hereinabove, it is not intended that the invention be limited solely thereto, but is to include all the variations and modifications falling within the scope of the appended claims.

What is claimed is:

1. A quaternary alloy of elements expressed by the following formula $$Zr_{1-x}Ti_xMn_{2-y}Fe_y$$

wherein "x" has a value in a range from about 0.2 to about 0.3, and "y" has a value in a range from about 0.1 to about 1.

2. The alloy of claim 1 wherein "x" has a value of about 0.2 and "y" has a value of about 1.

3. The alloy of claim 1 wherein "x" has a value of about 0.3 and $\mp$"y" has a value of about 1.

4. The alloy of claim 1 wherein "x" has a value of about 0.25 and "y" has a value of about 0.9.

5. A hydride of the alloy $Zr_{0.8}Ti_{0.2}MnFe$.

6. A hydride of the alloy $Zr_{0.7}Ti_{0.3}MnFe$.

7. A hydride of the alloy $Zr_{0.75}Ti_{0.25}Mn_{1.1}Fe_{0.9}$.

8. A Laves phase intermetallic compound provided by a quaternary alloy comprising zirconium and manganese in a ZrMn$_2$ stoichiometric relationship and a C14 hexagonal crystal structure, the alloy further comprising titanium and iron in partial substitution, respectively, for zirconium and for manganese, wherein the quaternary alloy has elements in atomic ratios as expressed by the formula $$Zr_{1-x}Ti_xMn_{2-y}Fe_y$$

wherein "x" has a value in a range of about 0.05 to about 0.3 and "y" has a value in a range from about 0.1 to about 0.9, in amounts so as to maintain substantially the ZrMn$_2$ stoichiometry, the crystal structure characterized by lattrice parameters of $$a = 4.92 \text{ Å to } 5.03 \text{ Å}$$

$$b = 8.10 \text{ Å to } 8.25 \text{ Å}.$$

9. The compound of claim 8 wherein the quaternary alloy has elements in atomic ratios as expressed by the formula $$Zr_{0.8}Ti_{0.2}MnFe$$

10. The compound of claim 8 wherein the quaternary alloy has elements in atomic ratios as expressed by the formula $$Zr_{0.7}Ti_{0.3}MnFe.$$

11. The compound of claim 8 wherein the quaternary alloy has elements in atomic ratios as expressed by the formula $$Zr_{0.75}Ti_{0.25}Mn_{1.1}Fe_{0.9}.$$

12. A method for forming an hydride of an alloy comprising the steps of
(a) preparing a quaternary alloy of elements expressed by the formula $$Zr_{1-x}Ti_xMn_{2-y}Fe_y$$

wherein "x" has a value in a range from about 0.05 to about 0.3 and "y" has a value in a range from about 0.1 to about 1, said alloy capable of storing hydrogen as a hydride of the alloy;
(b) subjecting the alloy with hydrogen so that hydrogen is absorbed into the alloy.

13. The method of claim 12 further characterized by the step of decomposing the hydride to cause desorption of hydrogen from the alloy.

14. An alloy having the empirical formula $$Zr_{0.8}Ti_{0.2}MnFe.$$

15. An alloy having the empirical formula $$Zr_{0.7}Ti_{0.3}MnFe.$$

16. An alloy having the empirical formula $$Zr_{0.75}Ti_{0.25}Mn_{1.1}Fe_{0.9}.$$

17. A hydride having the empirical formula $$Zr_{0.8}Ti_{0.2}MnFeH_3.$$

18. A hydride having the empirical formula $$Zr_{0.7}Ti_{0.3}MnFe_2H_2.$$

19. A hydride having the empirical formula $$Zr_{0.75}Ti_{0.25}Mn_{1.1}Fe_{0.9}H_{3.1}.$$

* * * * *